(No Model.)
C. D. STANFORD.
APPARATUS FOR COOLING AND AERATING WORT FOR MALT LIQUORS.
No. 435,000. Patented Aug. 26, 1890.
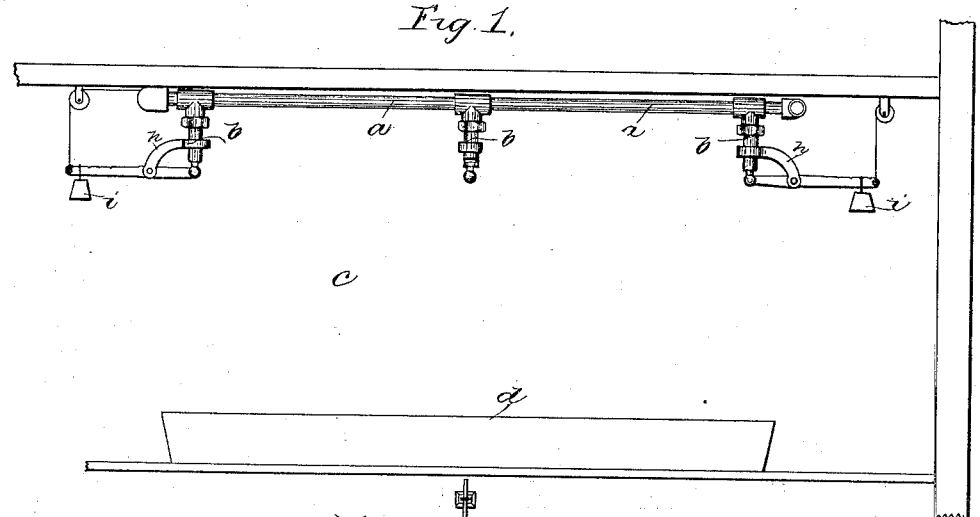
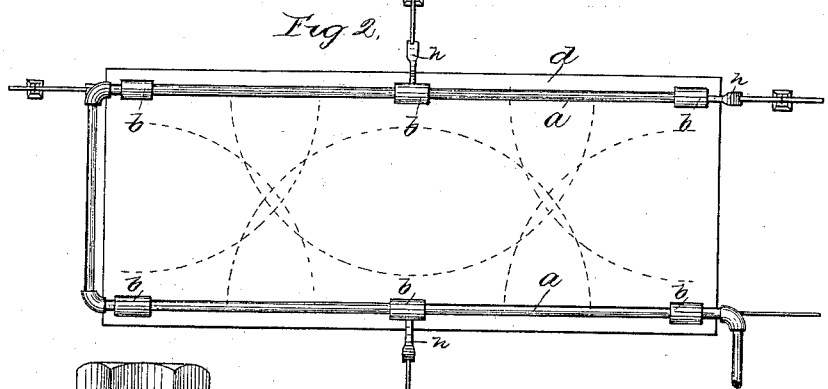
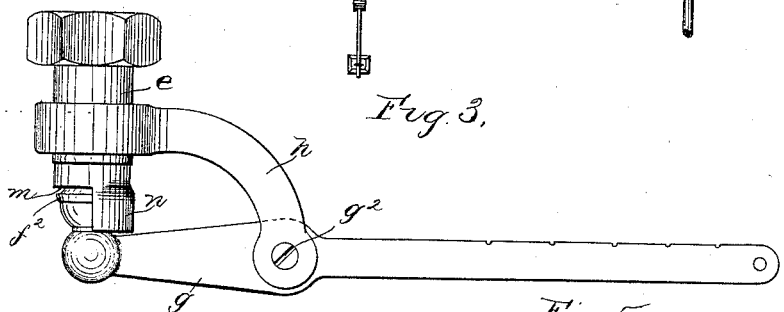
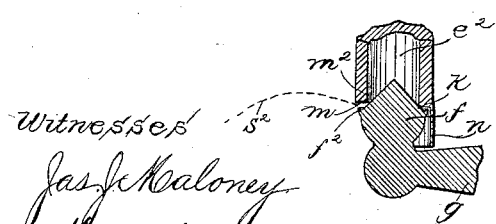
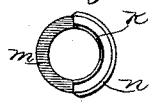
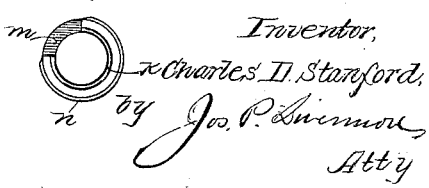
Witnesses:
Jas. J. Maloney
M. E. Hill
Inventor,
Charles D. Stanford,
by Jos. P. Livermore,
Atty

UNITED STATES PATENT OFFICE.

CHARLES D. STANFORD, OF BOSTON, MASSACHUSETTS, ASSIGNOR TO THE HANFORD-STANFORD COMPANY, OF PORTLAND, MAINE.

APPARATUS FOR COOLING AND AERATING WORT FOR MALT LIQUORS.

SPECIFICATION forming part of Letters Patent No. 435,000, dated August 26, 1890.

Application filed May 26, 1890. Serial No. 353,158. (No model.)

*To all whom it may concern:*

Be it known that I, CHARLES D. STANFORD, of Boston, county of Suffolk, State of Massachusetts, have invented an Improvement in Apparatus for Cooling and Aerating Wort for Malt Liquors, of which the following description, in connection with the accompanying drawings, is a specification, like letters on the drawings representing like parts.

My invention relates to an apparatus for cooling and aerating malt liquors in accordance with the method forming the subject of Letters Patent No. 382,155, dated May 1, 1888, the present invention being an improvement on the apparatus shown and described in Letters Patent No. 382,156 of the same date.

The apparatus described in the said Patent No. 382,156 comprises a pump for forcing the hot wort and a delivery-pipe provided with a series of spraying devices or atomizers opening into the atmosphere above a collecting-receptacle, upon which the liquid delivered from the spraying device in the form of a spray is collected. The spraying devices heretofore employed in apparatus of this kind throw the spray laterally outward on all sides of the nozzle, so that the spray delivered from a single atomizer falls over a large area on the collecting-receptacle, and it is necessary for efficient operation of the atomizers that they should produce a considerable lateral spread or throw of the spray.

In applying this apparatus to breweries the spraying devices are usually placed in the upper part of the existing cooling-rooms, and the collecting-receptacle is the surface-cooler previously used in the breweries to partially cool the hot wort standing in a shallow body in said surface-cooler before it is run over the refrigerators, by which it is reduced to the proper temperature to enter the fermenting-vats.

In applying existing apparatus, as shown in Letters Patent No. 382,156, in existing breweries it frequently happens that the existing cooling-room and surface-cooler are not of proper shape or dimension for the proper operation of the improved apparatus. It sometimes happens, for example, that the surface-cooler is long and narrow, (perhaps not over eight or ten feet wide,) while the spraying devices for efficient operation will throw the spray over an area below each which is ten or twelve feet in diameter, so that a portion of the spray would fall outside of the surface-cooler or collecting-receptacle.

The main object of the present invention is to overcome this difficulty and to produce atomizers or spraying devices that can be used efficiently in connection with collecting-receptacles the dimensions of which do not admit of the efficient use of atomizers that throw the spray on all sides of the axis of the atomizers. In order to effect this result, the spraying devices or atomizers forming the subject of this invention comprise a delivery-tube having a large unobstructed passage through it, terminating in a mouth or opening through which the liquid is delivered, and a movable plug or stopper controlling said mouth, which is provided with a seat against which the said stopper is held while the spraying operation is going on, the said seat extending part way around the mouth of the delivery-tube, usually about one-half of the way around for some positions of the atomizers, and three-fourths of the way around for other positions of the atomizers, while in the remainder of the way around the mouth of the delivery-tube the seat is cut away, so as to afford a narrow orifice between the edge of this portion of the mouth of the delivery-tube and the adjacent side of the stopper or plug, which is properly shaped to act as a deflector for the liquid issuing through the said orifice and to cause the same to be broken up into fine spray. By this construction the plug seats tightly on the mouth of the delivery-tube around a portion of its periphery, wholly preventing the issue of liquid on that side of the delivery-tube, while at the other side, where the orifice is formed, the liquid issues and is thrown and spreads laterally away from the axis of the delivery-tube. Thus by setting the atomizers so formed nearly over the edge of the collecting-vat with the closed part of the delivery-tube toward the outside of the collecting-vat and the orifice toward the middle of the collecting-vat the spray will be thrown in the proper direction to be received upon the collecting-vat even if the width of the latter be not much more than half the diameter of the circle that would be covered by the falling spray if permitted to issue on all sides of the spraying device, as has been heretofore generally practiced.

The invention further consists in details of construction which will be hereinafter pointed out.

Figure 1 is a side elevation of an apparatus for cooling wort for malt-liquors embodying this invention; Fig. 2, a plan view thereof; Fig. 3, a side elevation of one of the spraying devices; Fig. 4, a sectional detail of the mouth of the delivery-tube and the plug co-operating therewith; Figs. 5 and 6, plan views of the mouth of the delivery-tube, showing different shapes of the same according to the location of the devices relative to the collecting-receptacle.

The apparatus comprises the delivery-tube $a$ for the hot wort, which is introduced to said pipe under pressure from the boiling kettle by means of a pump or other liquid-forcing apparatus, the said pipe being provided with a number of spraying devices $b$, which with said pipe are located in the upper part of the usual cooling-room $c$, provided with a collecting vat or receptacle $d$, arranged below the said spraying devices $b$, so as to receive the spray delivered therefrom after it has fallen through the atmosphere in the cooling-chamber $c$, the general arrangement and operation of said parts being substantially the same as that of the apparatus shown and described in said Patent No. 382,156, before referred to.

The spraying devices heretofore commonly used in apparatus of this kind have been properly constructed to throw the spray outward from the axis of the spraying device on all sides, so that the said spray falls over a large area below the spraying device, the area on which the spray from a given atomizer falls being substantially circular in shape, with the axis of the spraying device at the middle of the circle.

It frequently happens that the cooling-chamber $c$ and collecting-receptacle $d$ are of such shape or dimensions, as best shown in Fig. 2, that atomizers located over the middle line of said receptacle would throw the spray outside of the said receptacle if said atomizers were properly constructed to give an efficient cooling and aerating effect upon the spray. In order to obviate this objection, the spraying devices are, in accordance with the present invention, provided with an orifice extending only part way around the axis, so that by locating the spraying devices as shown in Fig. 2 and properly shaping the orifices the spray from each will be thrown over practically the area indicated by the curved dotted lines, and will thus all fall within the receptacle, although the lateral throw of the spraying devices is sufficient to throw a large percentage outside the collecting-receptacles if said atomizers were constructed to throw on all sides, as has heretofore been commonly practiced.

In order to properly control the direction in which the spray is delivered, the atomizers are constructed as best shown in Figs. 3 to 6, inclusive, the said atomizers comprising a delivery-tube $e$, having an unobstructed passage $e^2$, Fig. 4, through it, terminating at its lower end in a mouth or opening of practically the full diameter of said bore, so that at proper times a solid stream may be caused to flow through and out of said delivery-pipe for the purpose of thoroughly cleaning the same.

In order to effect the breaking up of the liquid delivered from the pipe $e$ into fine spray, as is required for the cooling and aerating operation, the apparatus is provided with a plug $f$, supported on the lever $g$, fulcrumed at $g^2$ on an arm $h$, extending from the body of the spraying device and provided with a weight $i$, (see Fig. 1,) which tends to press the plug $f$ toward the mouth of the delivery-tube $e$, the construction of these parts being, in the features thus far mentioned, substantially the same as in Patent No. 426,805, dated April 29, 1890. As shown in that patent, however, and in all the spraying devices of this class, so far as known to me, the plug $f$ has been held a short distance from the edge of the mouth or opening of the delivery-tube $e$, thus forming with said mouth an annular orifice extending all around the axis of the delivery-tube through which the liquid is delivered, so as to spread in all directions from the axis of the delivery-tube.

In accordance with the present invention a portion of the mouth of the delivery-tube is properly constructed to form a seat $k$, against which the corresponding portion of the plug $f$ fits tightly, so as to wholly prevent the escape of liquid over the said seat, which usually extends about one-half or three-fourths around the delivery-tube, according as the atomizer is to be located over one edge or over a corner of the collecting-receptacle, as will be readily understood from Figs. 1 and 2. Around the remaining portion of the mouth of the delivery-tube the edge is cut away, as shown at $m$, Figs. 3 to 6, inclusive, to a point slightly above the seat $k$, so that the edge of the wall of the delivery-tube at this part terminates a slight distance from the surface of the plug $f$, forming a narrow orifice between the two, as best shown at $m^2$, Fig. 4, through which orifice the liquid is delivered, being thrown outward from the axis of the delivery-tube only on the side that the orifice $m^2$ is formed. The plug $f$ is shown in this instance as provided with a slight lip or projection $f^2$ below the orifice $m$, against which the thin sheet of liquid issuing through the said orifice strikes and by which it is partially broken and thrown upward, as indicated by the dotted line 2, Fig. 4. The said lip $f^2$ need be continued only around the portion of the plug that co-operates with the cut-away or recessed portion of the mouth of the delivery-tube to form the orifice for the spray.

The plug $f$, when properly fitted with relation to its seat in the mouth of the delivery-tube, is preferably fixed upon the lever $g$; but it is movable toward and from the mouth of the delivery-tube by turning the said lever $g$ on its fulcrum, and may be moved far enough to wholly clear the path of the liquid issuing from the delivery-tube, so that a solid stream of hot water may be delivered therethrough for the purpose of flushing out the entire apparatus.

As it may sometimes happen that in the spraying operation the plug $f$ may not seat tightly on the seat $k$, the liquid might escape over the seat $k$, in which case it would be thrown outside of the collecting-receptacle $k$ unless means were taken to prevent. In order to prevent such action from taking place, the spraying device is provided with a depending hood or shield $n$, which extends around and below the edge of the adjacent portion of the plug, so that such liquid as may escape between the said seat $k$ and surface of the plug will be directed by the hood $n$ straight downward parallel with the axis of the delivery-tube, and will thus fall within the collecting-receptacle. The hood $n$ extends only around the portion of the delivery-tube that is provided with the seat $k$, leaving the space clear around the portion of the plug $f$ that constitutes one side of the orifice $m^2$.

By the herein-described construction the spraying apparatus may be readily applied and efficiently worked in connection with previously-existing cooling-rooms and surface-coolers of such shape and dimensions that the spraying devices of ordinary construction could not be used efficiently in connection therewith, and a great saving in cost is thus effected in applying the cooling and aerating apparatus to such breweries.

I claim—

1. A spraying device consisting of a delivery-tube open at one end and provided with a seat extending part way around the said open end, combined with a plug held against the said seat and constituting with the unseated portion of the mouth of the delivery-tube a narrow orifice for the delivery of the liquid, substantially as described.

2. A spraying device consisting of a delivery-tube open at one end and provided with a seat extending part way around the said open end, combined with a plug held against the said seat and constituting with the unseated portion of the mouth of the delivery-tube a narrow orifice for the delivery of the liquid, and a hood or shield depending from said delivery-tube around the seat portion thereof, substantially as and for the purpose described.

In testimony whereof I have signed my name to this specification in the presence of two subscribing witnesses.

CHARLES D. STANFORD.

Witnesses:
 JOS. P. LIVERMORE,
 M. E. HILL.